(12) United States Patent
Tanaka et al.

(10) Patent No.: US 7,317,501 B2
(45) Date of Patent: Jan. 8, 2008

(54) OPTICAL FILM, LIGHT REFLECTIVE FILM, LIQUID CRYSTAL DISPLAY PANEL, METHOD AND APPARATUS FOR PRODUCING AN OPTICAL FILM, METHOD OF PRODUCING A DIE ROLLER, AND METHOD AND APPARATUS FOR LAMINATING AN OPTICAL FILM

(75) Inventors: Mitsuhiro Tanaka, Yamatokoriyama (JP); Yuji Saai, Nara (JP)

(73) Assignee: Sharp Kabushiki Kaisha, Osaka (JP)

( * ) Notice: Subject to any disclaimer, the term of this patent is extended or adjusted under 35 U.S.C. 154(b) by 45 days.

(21) Appl. No.: 09/841,666

(22) Filed: Apr. 24, 2001

(65) Prior Publication Data

US 2002/0008899 A1    Jan. 24, 2002

(30) Foreign Application Priority Data

Apr. 26, 2000  (JP) .......................... P2000-126498
Feb.  7, 2001  (JP) .......................... P2001-031310

(51) Int. Cl.
   *G02F 1/133*   (2006.01)
   *B32B 3/00*    (2006.01)
   *B31F 1/20*    (2006.01)

(52) U.S. Cl. .................. 349/112; 428/172; 156/462

(58) Field of Classification Search ............... 349/112, 349/113; 362/333, 339; 428/172; 425/373–374; 156/462
See application file for complete search history.

(56) References Cited

U.S. PATENT DOCUMENTS

| | | | | |
|---|---|---|---|---|
| 2,310,790 A | * | 2/1943 | Jungersen | 359/547 |
| 3,935,359 A | * | 1/1976 | Rowland | 428/172 |
| 4,343,848 A | * | 8/1982 | Leonard, Jr. | 428/156 |
| 4,618,518 A | * | 10/1986 | Pricone et al. | 428/41.5 |
| 4,911,096 A | * | 3/1990 | Munakata | 116/334 |
| 5,534,208 A | * | 7/1996 | Barr et al. | 264/160 |
| 5,804,300 A | * | 9/1998 | Maro et al. | 428/335 |
| 6,513,414 B1 | * | 2/2003 | Denney et al. | 83/874 |

FOREIGN PATENT DOCUMENTS

| | | | |
|---|---|---|---|
| JP | 6-59108 | | 3/1994 |
| JP | 408071801 A | * | 3/1996 |
| JP | 10-206611 | | 8/1998 |
| JP | A 10-311910 | | 11/1998 |
| JP | A 11-147255 | | 6/1999 |
| JP | A 11-248909 | | 9/1999 |
| JP | A 2000-47199 | | 2/2000 |

* cited by examiner

*Primary Examiner*—Andrew Schechter
*Assistant Examiner*—Hoan C. Nguyen
(74) *Attorney, Agent, or Firm*—David G. Conlin; Steven M. Jensen; Edwards Angell Palmer & Dodge LLP

(57) ABSTRACT

An object of the invention is to provide a light reflective film which can prevent moire fringes from occurring. A rough face in which a plurality of rows of pyramidal convex portions that are linearly continuous are adjacently formed in parallel with one another is formed on one face of a die film. The rows of convex portions that are linearly continuous are inclined at a predetermined angle with respect to an edge of the die film. An optical film is produced by transferring the die film. A light reflective film is produced by vapor-depositing a light reflection film on the optical film. In a liquid crystal display panel having the light reflective film, the pitch of occurring moire fringes becomes so small that the moire fringes cannot be visually seen, and moire fringes can be prevented from occurring.

17 Claims, 11 Drawing Sheets

OPTICAL FILM, LIGHT REFLECTIVE FILM, LIQUID CRYSTAL DISPLAY PANEL, METHOD AND APPARATUS FOR PRODUCING AN OPTICAL FILM, METHOD OF PRODUCING A DIE ROLLER, AND METHOD AND APPARATUS FOR LAMINATING AN OPTICAL FILM

BACKGROUND OF THE INVENTION

1. Field of the Invention

The present invention relates to an optical film, a light reflective film, a liquid crystal display panel, a method and apparatus for producing an optical film, a method of producing a die roller, and a method and apparatus for laminating an optical film.

2. Description of the Related Art

Recently, application of a liquid crystal display panel to a word processor, a laptop personal computer, a pocket television, a portable telephone, and the like is rapidly advancing. Among liquid crystal display panels, a reflection type liquid crystal display panel and a semi-transmission type liquid crystal display panel in which light entering from the outside is reflected by a light reflective film receive attention because external light can be used so as to attain a lower power consumption, and the thickness and weight of the panel can be reduced.

In the field of a portable telephone and the like, a request for a multicolor display of a reflection type liquid crystal display panel is growing. Therefore, it is required to improve the performance of a light reflective film, and the brightness, i.e., the reflectance of a light reflective film becomes a critical point. As a high-performance light reflective film, known is a diffusive light reflective film in which concave and convex portions of a predetermined shape are formed in the surface of the light reflective film, thereby enabling light entering at various angles to be efficiently used. Therefore, it is expected to employ a diffusive light reflective film in which, in order to make reflected light from a light reflective film coincident with the visual angle of a liquid crystal display panel, concave and convex portions of the light reflective film are formed into a pyramidal structure having a predetermined inclination angle. A prior art of prism-shaped concave and convex portions having such a pyramidal structure is disclosed in Japanese Unexamined Patent Publication JP-A 11-147255 (1999).

As a method of producing a light reflective film having concave and convex portions, known are methods such as a photolithography method which is disclosed in Japanese Unexamined Patent Publication JP-A 11-248909 (1999), and an emboss method which is disclosed in Japanese Unexamined Patent Publication JP-A 10-311910 (1998), and in which a mother member is cut by a cutting device to form a matrix and the matrix is transferred to produce a light reflective film. Japanese Unexamined Patent Publication JP-A 2000-47199 (2000) discloses a method of producing a light reflective film. In the method, an roll-like original plate in which irregular concave and convex portions are formed in the surface is pressed against a resin layer to transfer the concave and convex shape of the original plate to the resin layer, and a reflection film made of aluminum and a thin film layer are laminated on the resin layer, thereby producing a light reflective film.

JP-A 10-311910 discloses a method in which moire fringes between a light reflective film and a display electrode are prevented from occurring, by randomly setting pitches of concave and convex portions.

In the production method disclosed in JP-A 11-248909 or JP-A 10-311910, an expensive apparatus is necessary for producing a light reflective film in which concave and convex portions are disposed with random pitches, and the productivity is lowered.

The irregular concave and convex portions in JP-A 2000-47199 cause a problem in that the directivity of reflected light is lowered. In a liquid crystal display panel, particularly, the liquid crystal has a visual angle direction, and hence the position where it is possible to see the display is inevitably restricted. In a light reflective film, therefore, it is not required to reflect light in a direction opposite to the visual angle direction, and it is desired to reflect also light which has been once reflected in the opposite visual angle direction, in the visual angle direction. Namely, a light reflective film is requested to have a directivity. In order to attain such a directivity of a sufficient level, the shapes and arrangement of the concave and convex portions must be regularly formed.

In a liquid crystal display panel having a light reflective film in which pyramids are arranged in a row to form a concave and convex shape, however, moire fringes are caused by the ridges of the pyramids and a row of pixel electrodes. Therefore, the ridges of the pyramids and the pixel electrodes must be arranged so as to be shifted from one another.

In the case where the row of pyramids is formed in parallel with an edge of the light reflective film, when the edge of the light reflective film is placed to be in parallel with an edge of a substrate, moire fringes are caused by the ridges of the pyramids and the row of pixel electrodes. In order to prevent such moire fringes from occurring, therefore, the light reflective film must be laminated obliquely with respect to the row of pixel electrodes.

In this case, when the light reflective film is laminated to the inside of the substrate as shown in FIG. 11, there is a region where the light reflective film does not exist, on the substrate. Therefore, the number of obtainable liquid crystal display panels is reduced and the productivity is lowered. When the light reflective film is laminated to the outside of the substrate as shown in FIG. 12, dusts are produced in a step of cutting portions of the light reflective film protruding from the substrate, and the dusts become foreign matters to lower the productivity. As shown in FIG. 13, in a step of laminating the light reflective film to the substrate, the substrate must be transported obliquely with respect to the light reflective film which is fed in a belt-like form from a roller. The work of this step is difficult to do.

SUMMARY OF THE INVENTION

It is a first object of the invention to provide an optical film and a light reflective film which can be easily laminated to a substrate and can prevent moire fringes, and also a liquid crystal display panel having the light reflective film.

It is a second object of the invention to provide a method and apparatus for producing an optical film which can be easily laminated to a substrate and can prevent moire fringes, and also a method of producing a die roller which is to be used in the apparatus.

It is a third object of the invention to provide a method and apparatus for laminating an optical film, in which the optical film can be easily laminated to a substrate.

The invention provides an optical film comprising a surface in which a plurality of rows of convex or concave portions that are linearly continuous are adjacently formed in parallel with one another, wherein ridges of the convex or concave portions of the rows are inclined at a predetermined angle with respect to an edge of the optical film.

According to the invention, a plurality of rows of convex or concave portions that are linearly continuous are formed in parallel in the surface of the optical film, and the rows are placed with forming the predetermined angle with respect to the edge of the optical film. In the case where a periodical structure which is parallel to the edge of the substrate is formed, for example, moire fringes due to the rows of the optical film and the periodical structure of the substrate can be prevented from occurring, simply by placing the edge of the optical film and that of the substrate so as to be in parallel with each other, and then laminating the film to the substrate. Furthermore, positioning between the substrate and the optical film can be easily performed. In the case where the optical film of the invention is used in a liquid crystal display panel, particularly, the arrangement direction of pixels and the rows of the optical film are placed with forming the predetermined angle therebetween. According to this configuration, the pitch of moire fringes due to the rows of the optical film and the pixel electrode group of the substrate becomes so small that the moire fringes cannot be visually seen. Therefore, a liquid crystal display panel in which moire fringes can be prevented from occurring can be produced with good reproducibility and productivity, simply by easy positioning of the optical film. In this case, it is not required to change the manner of placing the substrate depending on the size of the liquid crystal panel and that of the mother glass, and hence a plan for the number of obtainable liquid crystal display panels on which the optical film is placed can be easily established.

In the invention, it is preferable that the convex or concave portions have a pyramidal shape.

According to the invention, the optical film comprises a rough surface having the convex portions which are regularly arranged, and hence has sufficient directivity. A light reflective film which is obtained by growing a reflection film on the optical film can efficiently reflect light in the visual angle direction. Therefore, a liquid crystal display panel comprising the light reflective film can provide a bright display screen.

The invention provides a light reflective film comprising:
the optical film mentioned above; and
a reflection film which is grown on the optical film.

According to the invention, the light reflective film is formed by growing a light reflection film on an optical film having a rough surface on which a plurality of rows of convex or concave portions that are linearly continuous and pyramidal in shape are formed in parallel with one another. The rows are inclined at a predetermined angle with respect to an edge of the light reflective film. The arrangement direction of pixels and the rows which are linearly continuous are made inclined with each other at a predetermined angle, simply by placing the edge of the light reflective film and that of a liquid crystal display panel so as to be in parallel with each other, and then laminating the light reflective film to the liquid crystal display panel. According to this configuration, the pitch of moire fringes becomes so small that the moire fringes cannot be visually seen. Therefore, a liquid crystal display panel in which moire fringes can be prevented can be produced with good reproducibility and productivity, simply by easy positioning in which the light reflective film is laminated to the liquid crystal display panel along the edge of the panel.

The invention provides a liquid crystal display panel comprising:
a pair of substrates which are opposed to each other;
a liquid crystal sealed between the pair of substrates;
pixel electrodes which are formed on at least one of the pair of substrates; and
the light reflective film mentioned above,
wherein an edge of the light reflective film is placed in parallel with an edge of the substrate on which the pixel electrode are formed, and the ridges of the convex or concave portions of a pyramidal shape are inclined at a predetermined angle with respect to an arrangement direction of the pixel electrodes.

According to the invention, a reflection type liquid crystal display panel is produced by laminating a light reflective film comprising a rough surface having rows of convex portions which are regularly arranged, to the liquid crystal display panel. Since the light reflective film has the rough face having the convex portions which are regularly arranged, the light reflective film can reflect incident light at a high efficiency in the visual angle direction, and provide a bright display screen. Since the edge of the light reflective film is placed in parallel with that of the substrate, the rows on the rough face are inclined at a predetermined angle with respect to the arrangement direction of the pixel electrodes. Therefore, the pitch of occurring moire fringes becomes so small that the moire fringes cannot be visually seen.

In the invention, it is preferable that the light reflective film is placed between the pair of substrates.

According to the invention, the edge of the light reflective film is placed in parallel with that of the substrate, and the light reflective film is laminated to the inside of the substrate, whereby moire fringes can be prevented.

The invention provides an apparatus for producing an optical film, comprising a cylindrical die roller having a matrix formed on a surface thereof in which a plurality of rows of concave portions or convex portions that are linearly continuous are adjacently formed in parallel with one another so as to be inclined at a predetermined angle with respect to a circumferential direction of the die roller,
wherein the cylindrical die roller is rotated on a film to transfer a rough face of the matrix having the convex or concave portions, to a surface of the film.

According to the invention, the apparatus for producing an optical film has the die roller which is to be rotated on a film, so that the rough face having concave and convex portions can be transferred to the surface of the film. A plurality of rows of pyramidal concave portions that are linearly continuous are adjacently formed in parallel with one another in the cylindrical surface of the roller. The rows are inclined at the predetermined angle with respect to the circumferential direction of the die roller. When the die roller presses the film while being rotated on the film, the rough face in which a plurality of rows of pyramidal convex portions that are linearly continuous are adjacently formed is transferred and formed in the surface of the film. When the edge of the film is placed in parallel with the rotation axis of the die roller, an optical film is produced in which an edge of a ground film is inclined at a predetermined angle with respect to ridges of the rows of transferred convex portions that are linearly continuous. A light reflective film is formed by using the optical film. In this way, a light reflective film in which moire fringes can be prevented from occurring can be produced simply by using the die roller to transfer the concave and convex portions to the film. Therefore, a good productivity is attained. Furthermore, ridges of the rows of concave portions can be inclined at a predetermined angle with respect to an edge of the film by simple positioning in which the edge of the film is placed in parallel with the rotation axis of the die roller.

The invention provides an apparatus for producing an optical film, comprising:

a cylindrical die roller having a matrix formed on a surface thereof in which a plurality of rows of concave portions or convex portions that are linearly continuous are adjacently formed in parallel with one another, so as to be inclined at a predetermined angle with respect to a circumferential direction of the cylindrical die roller; and means for transferring a rough face of a die film to a surface of another film, the rough face being produced by rotating the die roller on the die film and having convex portions or concave portions that are linearly continuous.

According to the invention, the apparatus for producing an optical film has the die roller which is to be rotated on a film, so that the rough face having concave and convex portions can be transferred to the surface of the film. In the cylindrical surface of the die roller, a plurality of rows of pyramidal concave portions that are linearly continuous are adjacently formed in parallel with one another, and the rows are inclined at the predetermined angle with respect to the circumferential direction of the die roller. When the die roller presses the film while being rotated on the film, therefore, a rough face in which a plurality of rows of pyramidal convex portions that are linearly continuous are adjacently formed is transferred and formed in the surface of the film. When an edge of the film is placed in parallel with the rotation axis of the die roller, a die film is produced in which an edge of a ground film is inclined at a predetermined angle with respect to ridges of the rows of transferred convex portions that are linearly continuous.

The apparatus for producing an optical film further comprises the transferring means for transferring the rough face of the die film to a surface of another film. The rough face of the die film is transferred to the other film by the transferring means, whereby an optical film is produced. Moire fringes caused by the rows of an optical film and the periodical structure of a substrate can be prevented by disposing the thus produced optical film on the substrate so that an edge of the optical film and an edge of the substrate are placed in parallel with each other.

The invention provides a method of producing an optical film, comprising the step of:

rotating on a film a cylindrical die roller having a matrix formed on a surface in which a plurality of rows of concave portions or convex portions that are linearly continuous, are adjacently formed in parallel with one another so as to be inclined at a predetermined angle with respect to a circumferential direction of the die roller, to transfer the plurality of rows of concave portions or convex portions to a surface of the film.

According to the invention, the plurality of rows of pyramidal concave portions that are linearly continuous are adjacently formed in parallel with one another in the cylindrical surface of the die roller, and the rows are inclined at a predetermined angle with respect to the circumferential direction of the die roller. When the die roller presses the film while being rotated on the film, therefore, the rough face in which a plurality of rows of pyramidal convex portions that are linearly continuous are adjacently formed is transferred to the surface of the film. When an edge of the film is placed in parallel with the rotation axis of the die roller, an optical film is produced in which an edge of a ground film is inclined at a predetermined angle with respect to ridges of the rows of transferred convex portions that are linearly continuous. A light reflective film is formed by using the optical film. As described above, a light reflective film in which moire fringes can be prevented can be produced simply by using the die roller to transfer the concave and convex portions to the film, and a good productivity is attained. Furthermore, ridges of the rows of concave portions can be inclined at a predetermined angle with respect to an edge of the film by simple positioning in which the edge of the film is placed in parallel with the rotation axis of the die roller.

The invention provides a method of producing an optical film, the method comprising the steps of:

rotating on a film a cylindrical die roller having a matrix in which the plurality of rows of convex portions or concave portions that are linearly continuous are adjacently formed in parallel with one another to be inclined at a predetermined angle with respect to a circumferential direction of the cylindrical die roller to transfer the plurality of rows of convex portions or concave portions to the film to prepare a die film having a rough face having the plurality of rows of convex portions or concave portions; and transferring the rough face of the die film to a surface of another film.

According to the invention, a plurality of rows of pyramidal concave portions that are linearly continuous are adjacently formed in parallel with one another in the cylindrical surface of the roller. The rows are inclined at a predetermined angle with respect to the circumferential direction of the die roller. When the die roller presses the film while being rotated on the film, the rough face in which the plurality of rows of pyramidal convex portions that are linearly continuous are adjacently formed is transferred and formed in the surface of the film. When the edge of the film is placed in parallel with the rotation axis of the die roller, a die film is produced in which an edge of a ground film is inclined at a predetermined angle with respect to ridges of the rows of transferred convex portions that are linearly continuous.

The invention provides a method of producing a die roller, the method comprising the steps of:

placing a tip end of a cutting tool on a surface of a cylindrical roller which is rotated about a rotation axis, and reciprocating the cutting tool along an axis of the cutting tool to form a row of concave portions in the surface of the roller; and at the same time moving the cutting tool in a direction parallel to the rotation axis of the roller with the roller rotating to form from the row of concave portions a row of concave portions which is inclined at a predetermined angle with respect to a circumferential direction of the die roller.

According to the invention, the tip end of the cutting tool is reciprocated along the axis of the cutting tool with respect to the cylindrical surface of the roller which is rotated about the axis, to cut the cylindrical surface of the roller, so that a row of plural pyramidal concave portions is formed in the cylindrical surface of the roller, thereby producing a die roller. At the same time, while rotating the roller, the cutting tool is further moved in the direction parallel to the rotation axis of the roller, so that the row of formed pyramidal concave portions is inclined at a predetermined angle with respect to the circumferential direction of the die roller. In this way, a row of concave portions which is inclined at a predetermined angle can be easily formed in the surface of the die roller, simply by cutting the roller surface while moving the cutting tool in parallel with the rotation axis of the die roller.

This will be described in more detail. During a period when the forward rotating roller makes one rotation (or several rotations), the cutting tool is reciprocated while moving the cutting tool toward one side (or the other side) in the direction of the rotation axis of the roller. Next, the cutting tool is moved to a position adjacent to a pyramid which is lastly produced. Thereafter, the roller is reversely rotated. During a period when the reversely rotating roller makes one rotation (or several rotations), the cutting tool is reciprocated while moving the cutting tool toward the other side (or the one side) in the direction of the rotation axis. When the above operations are sequentially repeated, rows of concave portions which are inclined at a predetermined angle can be easily formed in the surface of the roller.

The invention provides an apparatus for laminating an optical film on a substrate, the apparatus comprising:

means for supplying a stacked member consisting of an optical film and a die film having a rough face on which the optical film is stacked, on a substrate;

means for making the supplied stacked member in close contact with the substrate;

means for bonding together the stacked member and the substrate which are closely in contact with each other; and means for stripping the die film from the stacked member bonded to the substrate so as to obtain the substrate to which the optical film having a rough face is bonded.

According to the invention, the apparatus for laminating an optical film, which laminates onto a substrate an optical film from a stacked member consisting of the optical film and a die film stacked on a rough face of the optical film, comprises the feeding means, the pressing means, the bonding means, and the stripping means. The stacked member is placed on the substrate by the feeding means, and the optical film of the stacked member is made in close contact with the substrate by the pressing means. Then, the stacked member and the substrate are bonded together by the bonding means, and the die film is stripped from the stacked member by the stripping means. In this way, the optical film of the stacked member which is fed by the feeding means, and a substrate which is sequentially transported can be continuously laminated with each other. Therefore, the productivity is improved.

The invention provides a method of laminating an optical film to a substrate, the method comprising the steps of:

making a stacked member which consists of an optical film and a die film having a rough face on which the optical film is stacked and is fed onto a substrate, in close contact with the substrate;

bonding the stacked member and the substrate which are closely in contact with each other, together; and stripping the die film from the stacked member which is bonded to the substrate, so as to obtain the substrate to which the optical film having a rough face is bonded.

According to the invention, the stacked member which is fed is placed on the substrate, and the optical film of the stacked member is made in close contact with the substrate. Then, the stacked member and the substrate are bonded together, and the die film is stripped from the stacked member. In this way, the optical film of the stacked member, and a substrate which is sequentially transported can be continuously laminated with each other. Therefore, the productivity is improved.

BRIEF DESCRIPTION OF THE DRAWINGS

Other and further objects, features, and advantages of the invention will be more explicit from the following detailed description taken with reference to the drawings wherein.

DETAILED DESCRIPTION OF THE PREFERRED EMBODIMENTS

Figure 1:
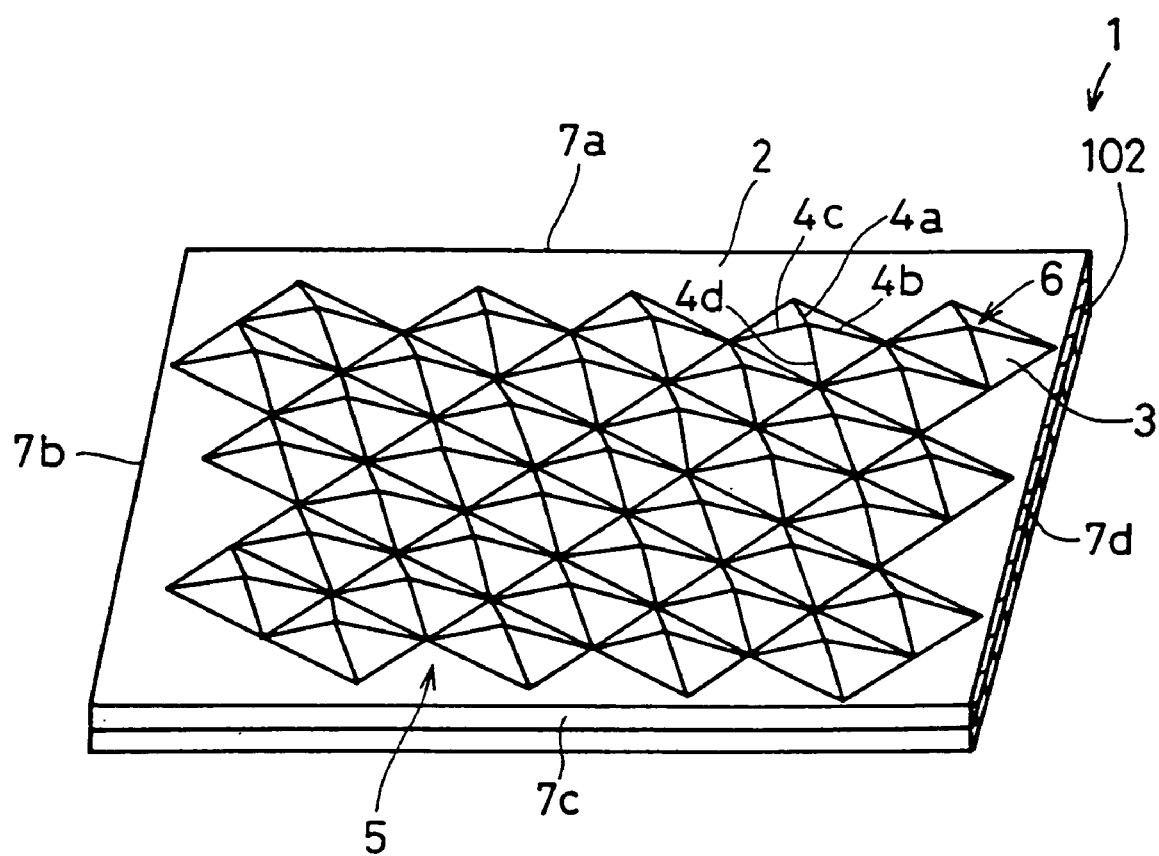
FIG. 1 is a perspective view showing a die film 1 of an embodiment of the invention.

Now referring to the drawings, preferred embodiments of the invention are described below.

Figure 2:
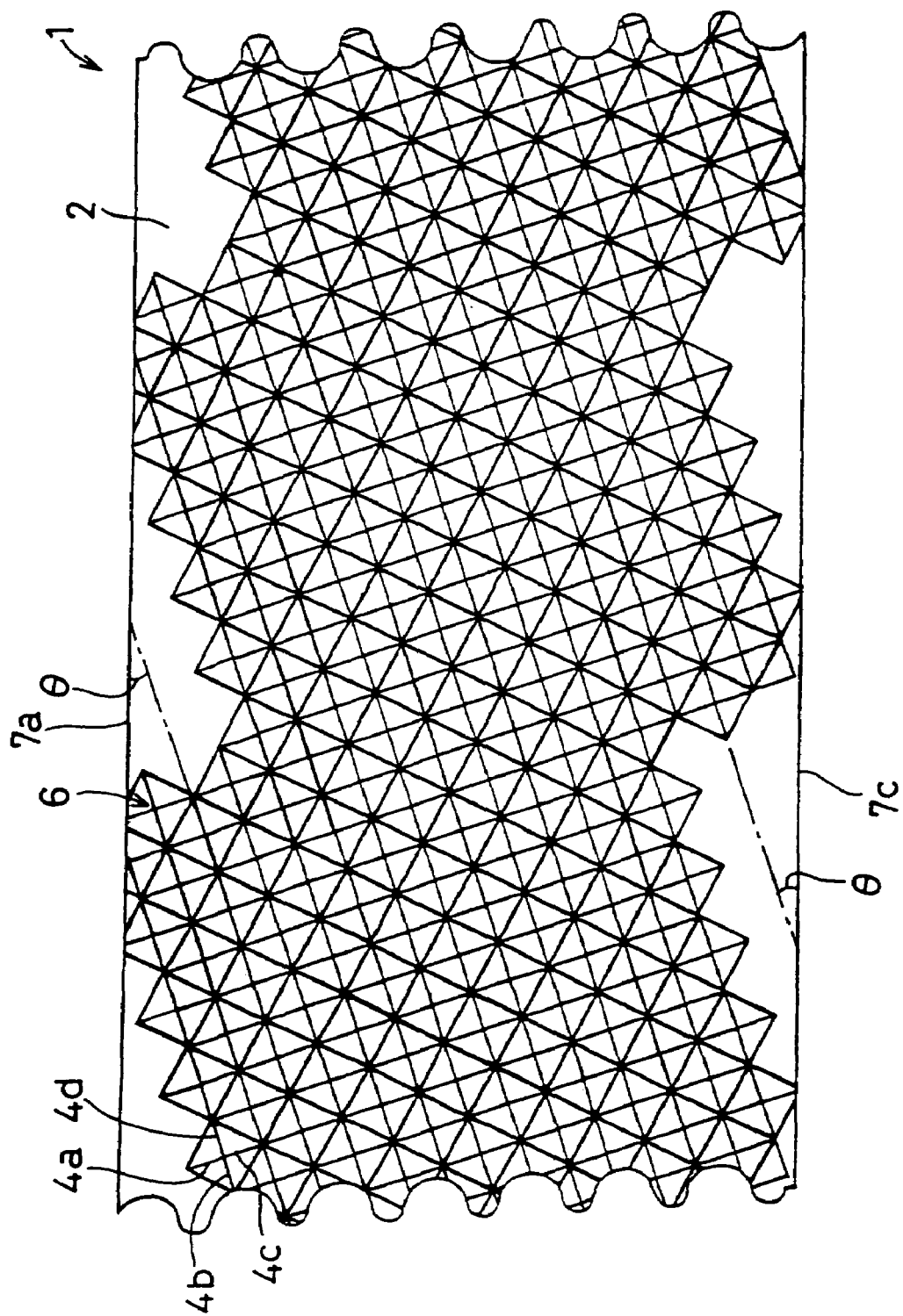
FIG. 2 is a plan view of the die film 1 shown in FIG. 1.
Figure 3:
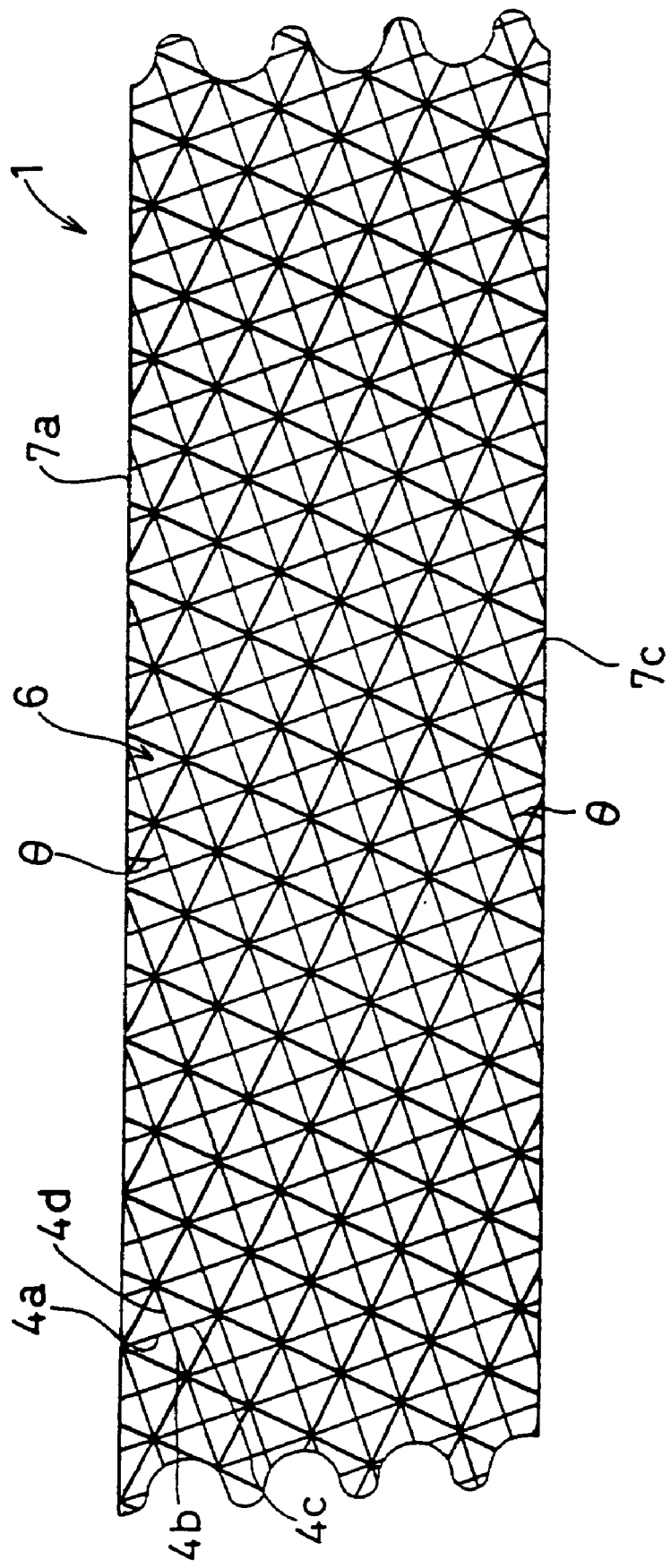
FIG. 3 is a plan view showing a die film 1a of another embodiment of the invention.

FIG. 1 is a perspective view showing a die film 1 of an embodiment of the invention, FIG. 2 is a plan view of the die film 1 shown in FIG. 1, and FIG. 3 is a view showing a die film 1a of another embodiment of the invention. When the die films 1 and 1a are to be generally referred, they are called merely the die film 1. The die film 1 is configured by a resin base material 2 and a base film 102. A rough face 5 in which a plurality of pyramidal convex portions 3 are regularly arranged is formed in one surface of the resin base material 2 having a strip-like and film-like shape. The base film 102 is laminated to the other surface of the base resin material 2.

For example, each of the convex portions 3 is a quadrangular pyramid having a square bottom face in which the length of one side is 40 μm, and a height of 2 μm. The plural convex portions 3 are linearly continuously formed to configure a plurality of rows 6 of the convex portions. The plural rows 6 of the convex portions are arranged so as to be adjacently formed in parallel with one another, thereby configuring the rough face 5. In the convex portions 3, all diagonal ridge lines 4a to 4d which are linearly continuous are inclined at a predetermined angle θ with respect to one of edges 7a to 7d of the rectangular resin base material 2. The predetermined angle θ is selected to be 10 deg. or more and 80 deg. less, and more preferably to be 20 deg. or more and 40 deg. less. In the embodiment, the predetermined angle θ is selected to be 30 deg. or π/6 radians.

Figure 4:
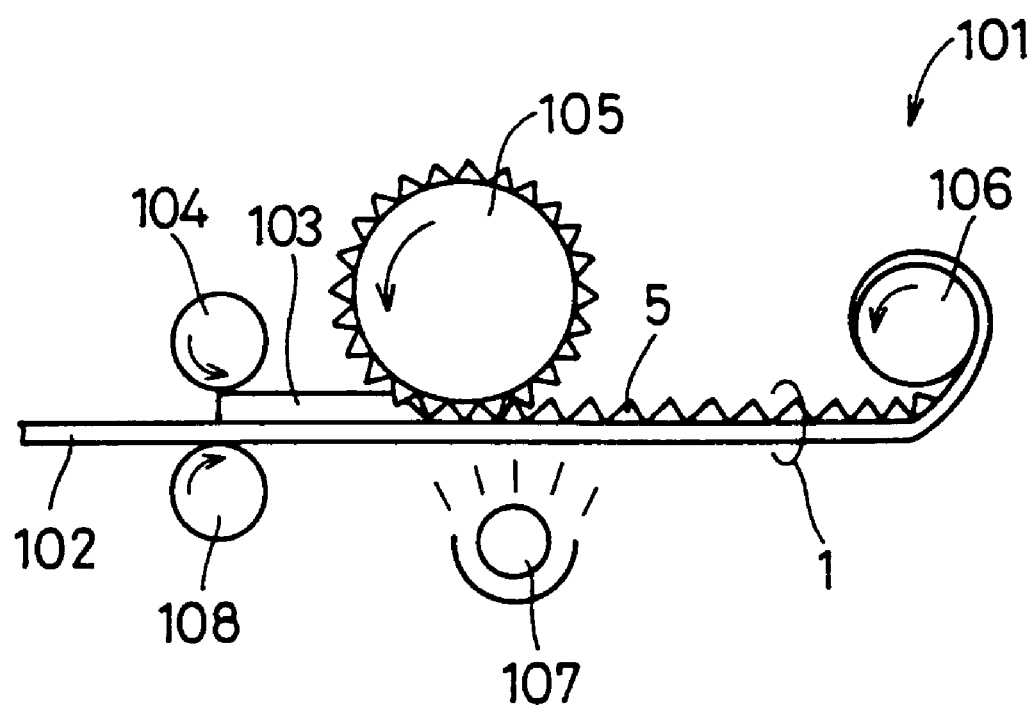
FIG. 4 is a view showing only the configuration of main portions of a die film producing section 101.

The thus configured die film 1 is produced by a die film producing section 101 of the apparatus for producing an optical film according to the invention. FIG. 4 is a view showing only the configuration of main portions of the die film producing section 101. The die film producing section 101 is an apparatus that produces the die film 1 by rotating a die roller 105 on which a matrix of the rough face 5 is formed, on a photosensitive resin layer 103 to transfer the rough face 5 to the photosensitive resin 103.

The matrix in which a plurality of concave portions 24 of the same pyramidal shape are regularly arranged is formed in the cylindrical surface of the die roller 105. For example, each of the pyramidal concave portions 24 is a quadrangular pyramid having a square bottom face in which the length of one side is 40 μm, and a height of 2 μm. The plural concave portions 24 are linearly continuously formed to configure a plurality of rows 32 of the concave portions. The plural rows 32 of the concave portions are arranged so as to be adjacently formed in parallel with one another, thereby configuring the matrix. A method of producing the matrix of the die roller 105 will be described later.

The die film producing section 101 includes: a feed roller 108 which feeds the long sheet-like base film 102 toward the downstream side (the right side of FIG. 4) in the transporting direction; a coating roller 104 which is opposed to the feed roller 108 across the base film 102; the die roller 105 which is disposed downstream from the coating roller 104 in the transporting direction; a take-up roller 106 which is disposed downstream from the die roller 105 in the transporting direction; and a light source 107 which is opposed to the die roller 105 across the base film 102.

Next, a method of producing the die film 1 will be described. The coating roller 104 holding the photosensitive resin 103 is rolled on one surface of the base film 102 which is fed by the feed roller 108, to uniformly coat the one surface of the base film 102 with the photosensitive resin 103. Then, the die roller 105 in which the matrix is formed in the cylindrical surface is rotated on the one surface of the applied photosensitive resin 103 to press the applied photosensitive resin 103, thereby transferring the rough face 5 thereto. The photosensitive resin is then exposed to light from the rear side by the light source 107, to be hardened, thereby producing the die film 1 in which the photosensitive resin 103 having the rough face 5 is stacked on the one face of the base film 102. The thus produced die film 1 is taken up by the take-up roller 106.

As shown in FIG. 2, the die film 1 is produced so that the width of the photosensitive resin 103 is substantially equal to that of the die roller 105. The die film 1a shown in FIG. 3 is produced so that the width of the photosensitive resin 103 is smaller than that of the die roller 105.

Figure 5:
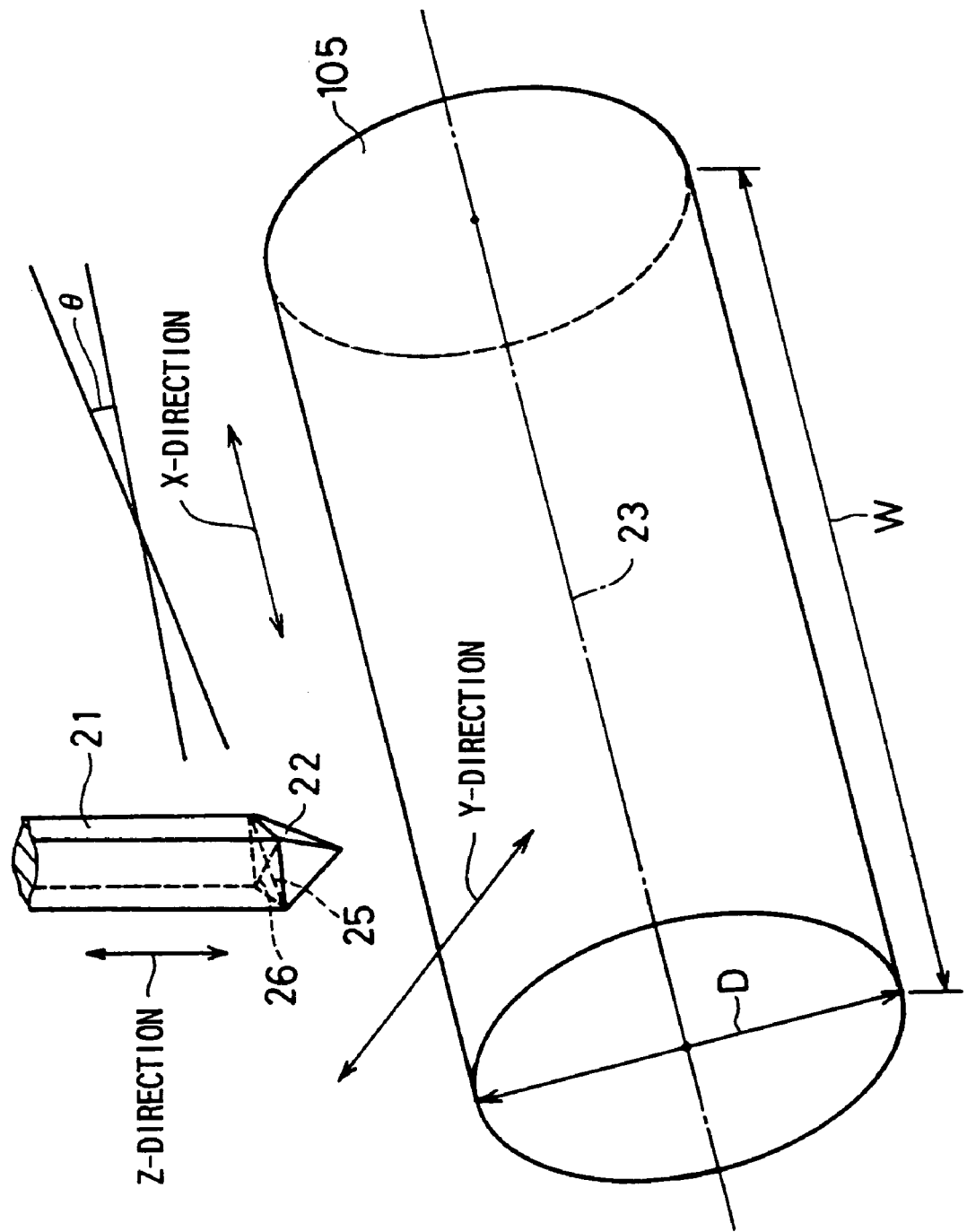
FIG. 5 is a perspective view showing a method of forming a matrix 28 of a rough face 5 in the cylindrical surface of a die roller 105.
Figure 6:
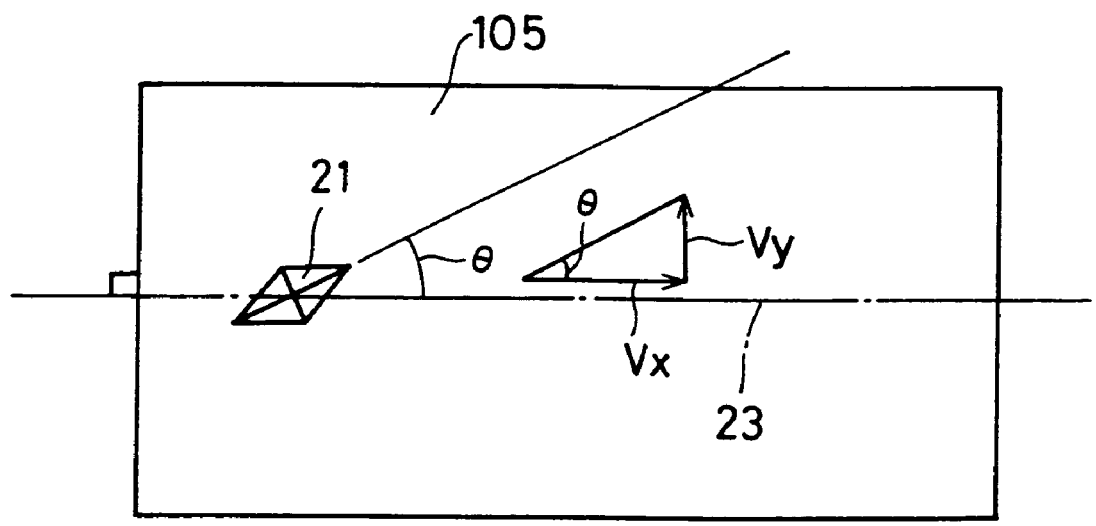
FIG. 6 is a view of the die roller 105 as seeing from the top.
Figure 7A:
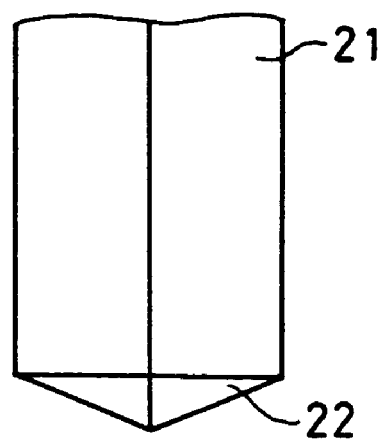
FIGS. 7A to 7C are views showing a cutting tool 21 which cuts the cylindrical surface of the die roller 105.
Figure 7B:
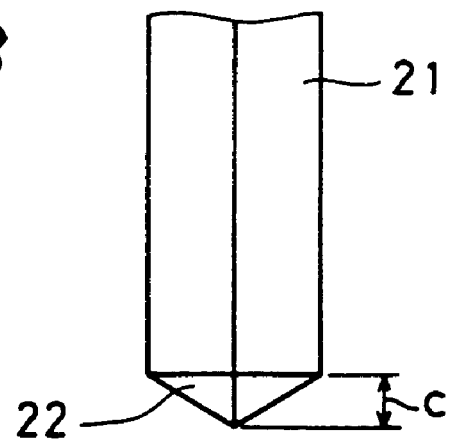
Figure 7C:
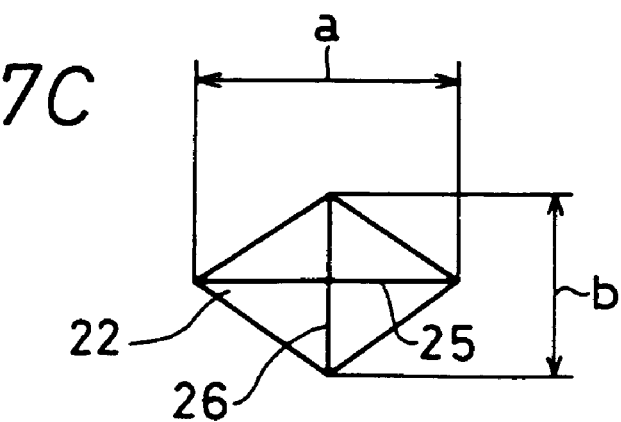
Figure 8:
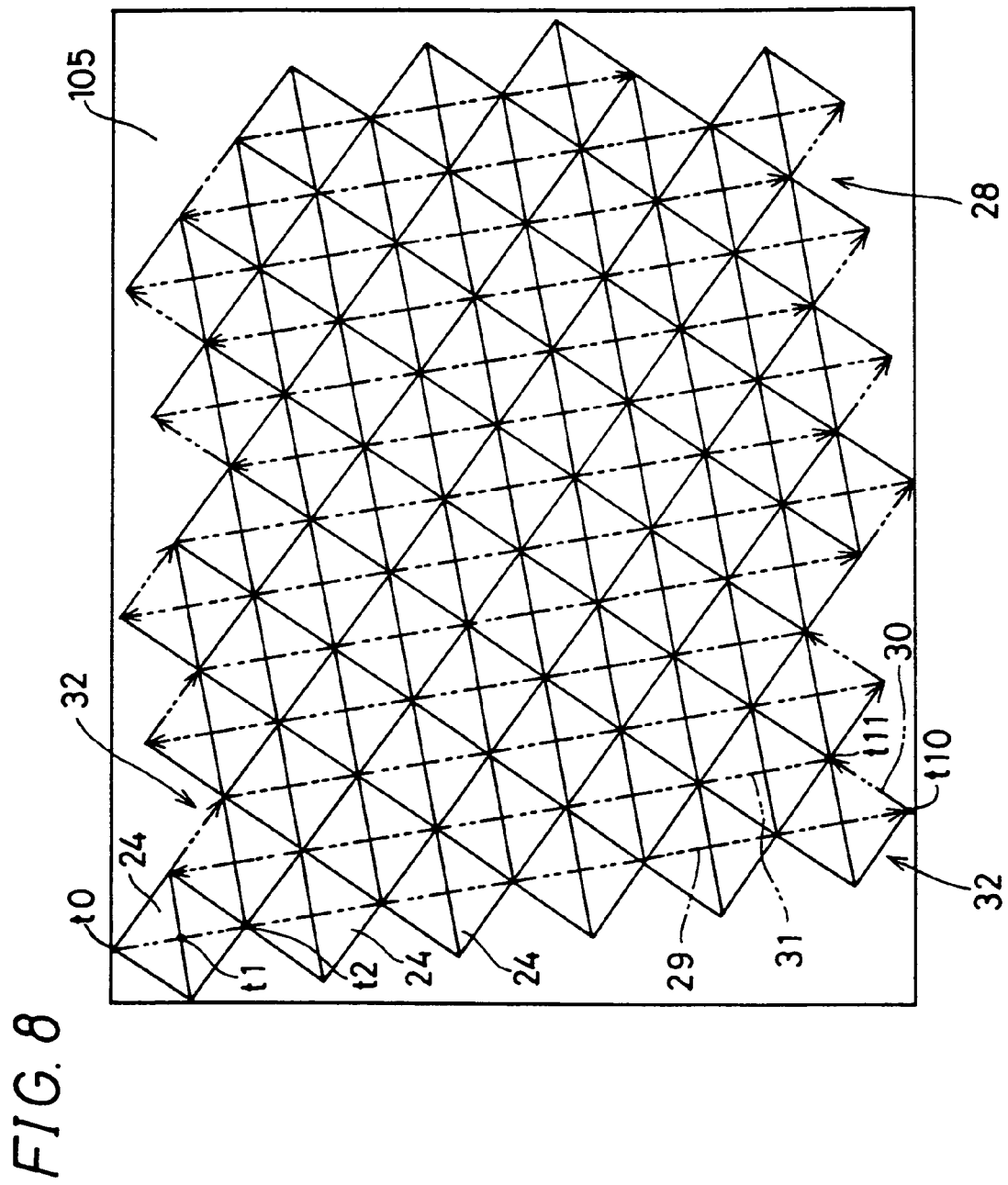
FIG. 8 is a development view of the die roller 105.

Next, the method of producing the die roller 105 which is characteristic of the die film producing section 101 will be described. FIG. 5 is a perspective view showing a method of forming the matrix 28 of the rough face 5 in the cylindrical surface of the die roller 105, FIG. 6 is a view of the die roller 105 as seeing from the top, and FIGS. 7A to 7C are views showing the cutting tool 21 which cuts the cylindrical surface of the die roller 105. FIG. 8 is a development view of the die roller 105.

As shown in FIG. 5, the die roller 105 has a cylindrical member, and the cylindrical surface is covered with a copper alloy on which a cutting work can be easily performed. In the embodiment, a roller having a diameter D=7 cm and a width W=40 cm is used as the die roller 105. As shown in FIGS. 7A to 7C, the cutting tool 21 has a tip end 22 which is a quadrangular pyramid consisted of diamond. Preferably, the tip end 22 has a pyramidal shape which is obtained by reducing the length of one of the linearly continuous ridges 4 of the convex portions 3 constituting the desired rough face 5 by a predetermined length. In the embodiment, a pyramidal member having a rhombic bottom face in which the major diagonal line 25 has a length a=150 μm and the minor diagonal line 26 has a length b=100 μm, and a height c=5 μm is selected as the tip end.

When the cylindrical surface of the die roller 105 is to be cut by the cutting tool 21, the cutting tool 21 is first placed above the die roller 105, in an inclined state where the major diagonal line 25 forms a predetermined angle θ with respect to the direction of the rotation axis 23 of the die roller 105. The predetermined angle θ of this inclination is equal to the angle θ formed by the ridges 4 of the convex portions 3 of the above-mentioned die film 1 and an edge 7 of the film-like resin base material 2. In the embodiment, for example, the predetermined angle θ is selected to be π/6 radians.

When the die roller 105 is to be cut, the cutting tool 21 is reciprocated at a velocity Vz in the vertical directions (Z-directions) while the die roller 105 is rotated about the rotation axis 23 at a surface velocity Vy in the circumferential direction (Y-direction), to cut the cylindrical surface of the die roller 105. At this time, the cutting tool 21 is further moved at a velocity Vx in the direction of the rotation axis 23 (X-direction) while being reciprocated in the vertical directions (Z-directions).

Specifically, as shown in FIG. 8, the cutting tool 21 is moved vertically downward at the velocity Vz from a cutting start position t0 to a position t1, to cut the die roller 105. At the position t1, the cutting depth reaches the maximum value. Thereafter, the cutting tool is moved vertically upward at the velocity Vz to a position t2, to cut the die roller 105. At the position t2, the cutting tool 21 returns to the same level as the cutting start position t0. The cutting tool 21 makes one reciprocation in the vertical direction in this way, whereby one pyramidal concave portion 24 is formed in the cylindrical surface of the die roller 105. When this one reciprocation is repeated as one cycle, a plurality of pyramidal concave portions 24 are formed in the cylindrical surface of the die roller 105. Each of the moving velocity and distance of the cutting tool 21 in the X-direction can be selected to have an arbitrary value in accordance with the desired shape of the concave portions 24.

At the same time as the above, the cutting tool 21 is moved at the velocity Vx along the rotation axis 23 from the cutting start position t0 to a position t10. At the same time, furthermore, the die roller 105 is rotated about the rotation axis 23 at the surface velocity Vy in the circumferential direction. Namely, the cutting tool 21 is reciprocated at the velocity Vy from the cutting start position t0 to the position t10 in a direction perpendicular to the rotation axis 23 (the lower side of FIG. 8). That is, the cutting tool 21 is reciprocated in the vertical direction (the direction perpendicular to the sheet of FIG. 8) while moving from the cutting start position t0 to the position t1 along a locus 29 which is indicated by a phantom line in FIG. 8, whereby a plurality of concave portions 24 are formed in the cylindrical surface of the die roller 105. Therefore, the plural concave portions 24 are linearly continuous along the linear locus 29 to form a row 32 of the concave portions. When the cutting tool 21 then reaches the position t10, the die roller 105 is reversely rotated so that the cutting tool is moved to a start position t11 of the next cycle along a locus 30 which is indicated by another phantom line in FIG. 8. When the cutting tool 21 reaches the start position t11, the die roller 105 and the cutting tool 21 are moved toward the other side (the left side of FIG. 8) along the rotation axis 23, and reciprocation is repeated in the same manner as described above, along a locus 31 which is indicated by a further phantom line in FIG. 8. When the above-mentioned operations are repeated as one cycle, plural rows 32 of concave portions are adjacently formed in the cylindrical surface of the die roller 105. The velocity Vx of the cutting tool 21 in the X-directions (the lateral directions in FIG. 8), and the surface velocity Vy of the die roller 105 satisfy the relationship of Vx/Vy=Tan θ.

The above will be described in more detail. The cutting operation is performed by, while the die roller 105 is rotated about the rotation axis 23 (moved toward the lower side in FIG. 8) at the surface velocity Vy=40$\sqrt{2}$ cos(π/6)=49 mm/s, lowering the cutting tool 21 from the cutting start position t0 at the velocity Vz=4 mm/s, and moving the cutting tool 21 along the rotation axis 23 toward the one side (the right side in FIG. 8) at the velocity Vx=40$\sqrt{2}$ sin(π/6)=28.3 mm/s. When the cutting depth then reaches 2 μm, the cutting operation is performed while raising the cutting tool 21 at the velocity Vz=4 mm/s. In this way, the concave portion 24 configured by a quadrangular pyramid having a square bottom face in which the length of one side is 40 μm, and a height of 2 μm. The second and third concave portions 24 are then sequentially formed along the locus 29. Thereafter, the concave portions 24 are sequentially formed along the locus 29 until the cutting tool reaches the limit position t10 where the concave portion 24 located immediately before a position where the die roller 105 completes one rotation can be formed. In the embodiment, 9,075 concave portions 24 (in the case where the moving distance of the die roller 105 is 18.15$\sqrt{6}$ cm) are linearly continuously formed along the locus 29.

Thereafter, the cutting tool 21 is moved by 40 sin(π/12) =10.4 μm from the position t10 in parallel with the rotation axis 23, and the die roller 105 is reversely rotated, and then moved by 40 cos(π/12)=38.6 μm, so that the cutting tool is positioned at a cutting start position t11 of the next cycle. While the die roller 105 is reversely rotated (moved toward the upper side in FIG. 8) at the surface velocity Vy=40$\sqrt{2}$ cos(π/6)=49 mm/s, the cutting tool 21 is moved along the rotation axis 23 toward the other side (the left side in FIG. 8) at the velocity Vx=40$\sqrt{2}$ sin(π/6)=28.3 mm/s, and lowered and raised at the velocity Vz=4 mm/s, so that the concave portions 24 are sequentially formed along the locus 31. In the embodiment, 9,073 concave portions 24 are linearly continuously formed along the locus 31. In the same manner as described above, the concave portions 24 are sequentially formed so as to have a close-packed structure as shown in FIG. 8. As a result, the matrix 28 of the rough face 5 of the ground film 1 for a reflection plate is formed in the cylindrical surface of the die roller 105.

In the embodiment, the concave portions 24 of the next cycle are formed by reversely rotating the die roller 105. In another forming method, when the die roller 105 completes one rotation, the cutting start position is moved, and thereafter the die roller 105 is again forward rotated so as to form the concave portions 24. Alternatively, two or more cutting tools 21 may be juxtaposed, and the concave portions 24 may be simultaneously formed by the plural cutting tools 21.

Figure 9:
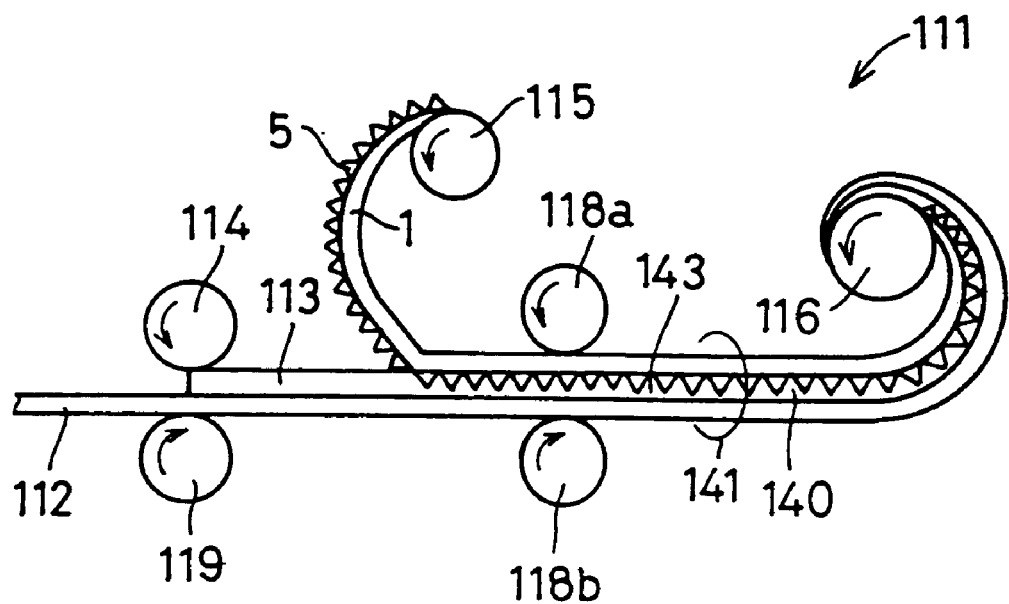
FIG. 9 is a view showing only the configuration of main portions of an optical film producing section 111.

FIG. 9 is a view showing only the configuration of main portions of an optical film producing section 111 in the apparatus for producing an optical film according to the invention. The apparatus for producing an optical film is configured by the die film producing section 101 of FIG. 4 and the optical film producing section 111 of FIG. 9. The optical film producing section 111 is an apparatus which transfers the rough face 5 of the die film 1 onto a photosensitive resin layer 103 to produce an optical film.

The optical film producing section 111 includes: a feed roller 119 which feeds a long sheet-like base film 112 toward the downstream side (the right side of FIG. 9) in the transporting direction; a coating roller 114 which is opposed to the feed roller 119 across the base film 112; a die film supply roller 115 which is disposed downstream from the coating roller 114 in the transporting direction; a pair of transfer rollers 118a and 118b (transferring means) which are disposed downstream from the die film supply roller 115 in the transporting direction; and a take-up roller 116 which is disposed downstream from the pair of transfer rollers 118a and 118b in the transporting direction.

Next, a method of producing an optical film 140 by the optical film producing section 111 will be described. The coating roller 114 holding the photosensitive resin 113 is rolled on one surface of the base film 112 which is fed by the feed roller 119, to uniformly coat the one surface of the base film 112 with the photosensitive resin 113. Next, the die film 1 is supplied from the die film supply roller 115 onto the one surface of the photosensitive resin 113 in state where the rough face 5 is opposed to the photosensitive resin 113. Then, the die film 1, the photosensitive resin 113, and the base film 112 are sandwiched between the pair of transfer rollers 118a and 118b to be closely in contact with one another, thereby transferring the rough face 5 of the die film 1 to the photosensitive resin 113. In this way, a stacked member 141 wherein the optical film 140 in which a rough face 190 is transferred to the photosensitive resin 113 is formed, the die film 1 is stacked on the side of the rough face 190 of the optical film 140, and the base film is stacked on the rear surface of the optical film 140 is fed toward the downstream side in the transporting direction. The fed stacked member 141 is taken up by the take-up roller 116.

Figure 10:
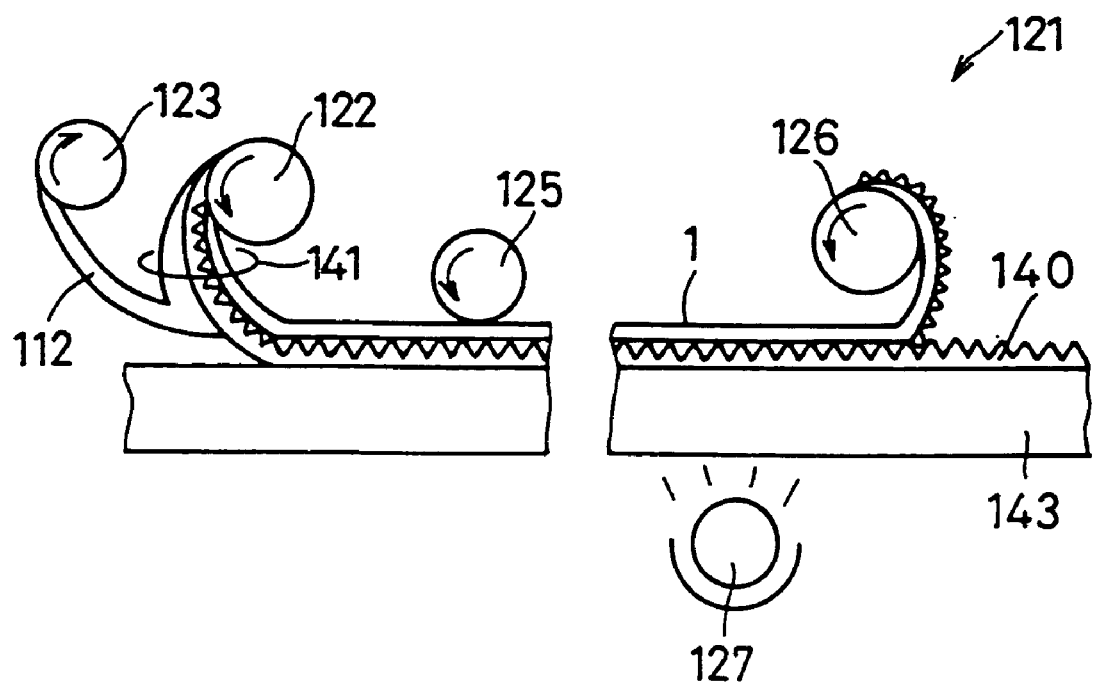
FIG. 10 is a view showing only the configuration of main portions of an optical film laminating apparatus 121.
Figure 11:
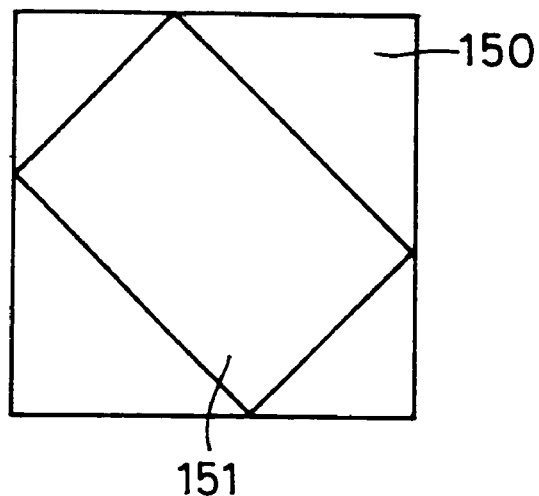
FIG. 11 is a view showing a state where a light reflective film 151 of the conventional art is laminated to the inside of a substrate 150.
Figure 12:
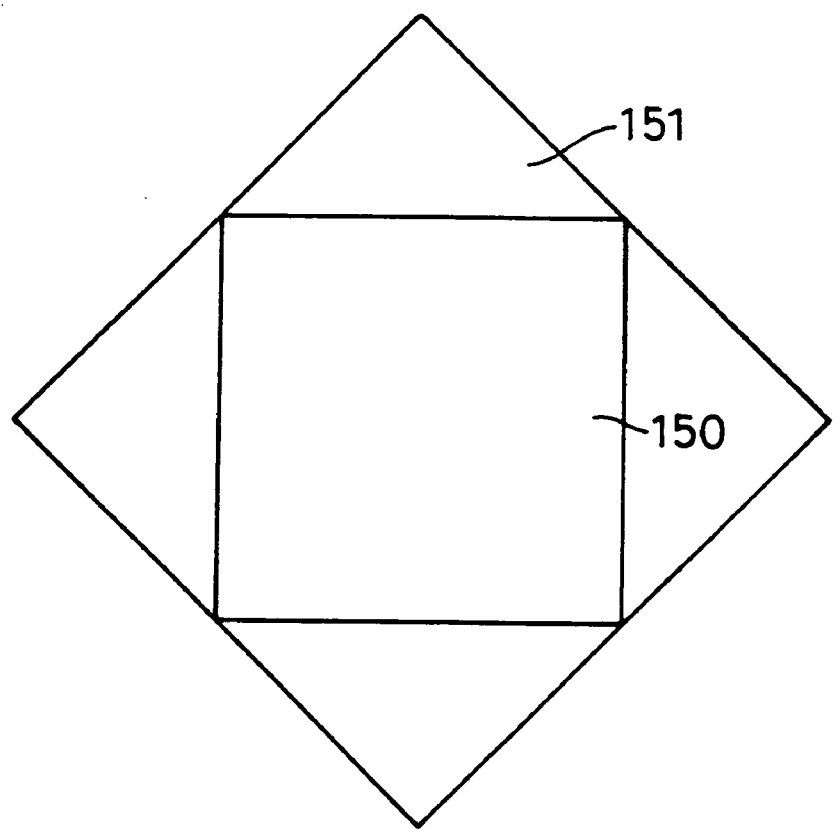
FIG. 12 is a view showing a state where the light reflective film 151 of the conventional art is laminated to the outside of the substrate 150.
Figure 13:
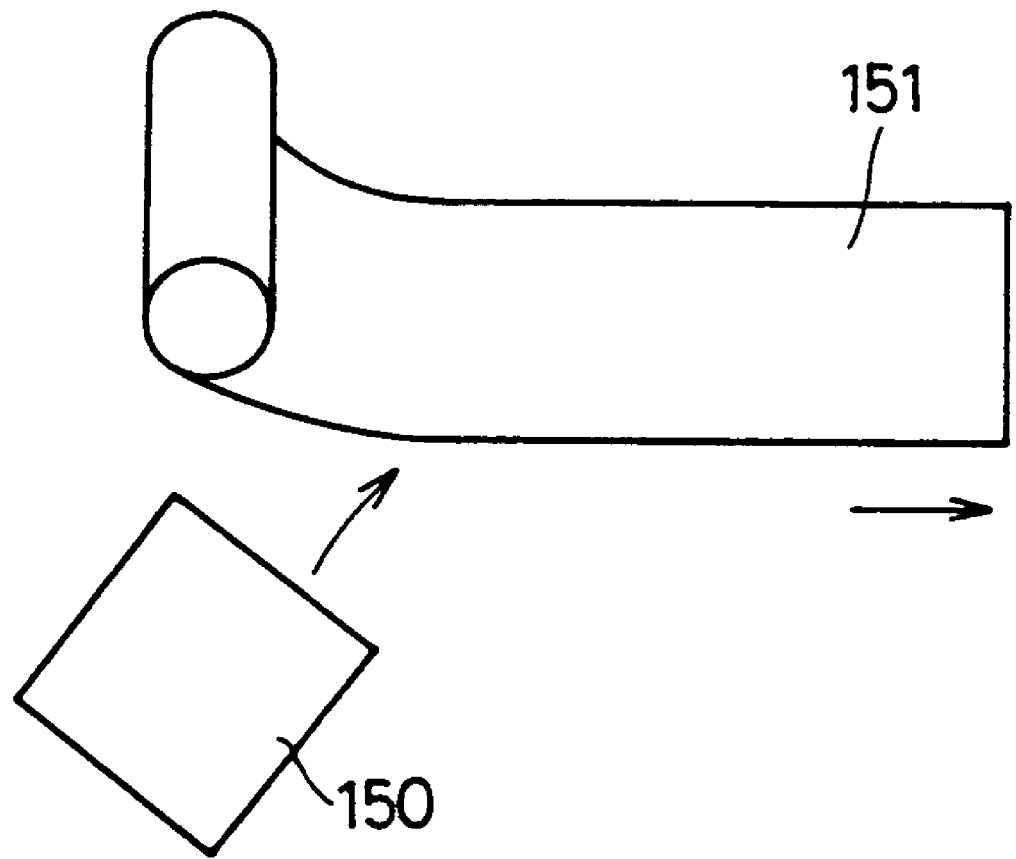
FIG. 13 is a view showing a step of laminating the light reflective film 151 of the conventional art to the substrate 150.

FIG. 10 is a view showing only the configuration of main portions of an optical film laminating apparatus 121 of the invention. The optical film laminating apparatus 121 is an apparatus for laminating only the optical film 140 from the stacked member 141 that is produced by the optical film producing section 111, to a substrate 143.

The optical film laminating apparatus 121 is configured by: a stacked-member supply roller 122 (supplying means) which is placed above the transported substrate 143; a first stripping roller 123 which is placed upstream (the left side of FIG. 10) from the stacked-member supply roller 122 in the transporting direction; a pressing roller 125 (pressing means) which is placed downstream (the right side of FIG. 10) from the stacked-member supply roller 122 in the transporting direction; an exposing device 127 (bonding means) which is placed downstream from the pressing roller 125 in the transporting direction; and a second stripping roller 126 (stripping means) which is placed downstream from the exposing device 127 in the transporting direction.

Next, a method of laminating the optical film 140 by the optical film laminating apparatus 121 will be described. The stacked member 141 including the optical film 140 is supplied by the stacked-member supply roller 122 so that the base film 112 is opposed to the surface of the substrate 143. Before the stacked member 141 is placed on the substrate 143, the base film 112 is stripped from the stacked member 141 by the first stripping roller 123. In the downstream side (the right side of FIG. 10) of the stacked-member supply roller 122 in the transporting direction, therefore, the surface of the substrate 143 and the rear surface of the optical film 140 of the stacked member 141 are opposed and contacted with each other.

The stacked member 141 which is in contact with the one surface of the substrate 143 is then pressed from the side of the die film 1 by the pressing roller 125, to make the substrate 143 and the optical film 140 of the stacked member 141 to be in close contact with each other. Thereafter, the optical film 140 of the stacked member 141 is exposed to light from the side of the substrate 143 by the exposing device 127, whereby the optical film 140 is hardened so that the optical film 140 is bonded to the substrate 143. Then, the die film 1 of the stacked member 141 is stripped off by the second stripping roller 126, with the result that only the optical film 140 is laminated onto the substrate 143. The optical film 140 which is laminated as described above is cut into a predetermined size in accordance with the size of the substrate 143.

When the above-mentioned operations are implemented on each of substrates 143 which are sequentially transported, the optical film 140 can be sequentially laminated to the substrates 143, resulting in an improved productivity. In the case where the width of the optical film 140 is substantially equal to that of the substrate 143, the laminating process is terminated by the above-mentioned step.

On the other hand, in the case where the width of the optical film 140 is smaller than that of the substrate 143, for example, in the case where the width of the optical film 140 is approximately half of that of the substrate 143, optical films of the conventional art in which the films must be obliquely laminated to substrates in order to prevent moire fringes from occurring are hardly joined together. Namely, it is difficult to position such optical films with respect to each other. By contrast, in the optical film 140 of the invention, the rows of the convex portions of the rough face 190 are inclined at the predetermined angle with respect to an edge of the optical film 140. Therefore, moire fringes can be prevented from occurring simply by moving the rollers 122 to 126 of the optical film laminating apparatus 121 in parallel with themselves so as to be in contact with the edge of the optical film 140 which is laminated in the first process, and again repeating the above-mentioned steps to laminate the second optical film 140.

A light reflective film is formed by vapor-depositing aluminum as a reflection film on the rough surface 190 of the optical film 140 which is laminated onto the substrate 143 as described above.

In the embodiment, the die roller 105 on which the matrix 28 is formed is rolled on the resin base material 2 to form the die film 1 having the rough face 5, and the rough face 5 of the die film 1 is again transferred to the photosensitive resin 113, thereby forming the optical film 140. Alternatively, the die film 1 may be used as an optical film. In another production method, a die film or an optical film may be produced by winding the resin base material 2 around the cylindrical surface of the die roller 105, and directly cutting the resin base material 2 by the cutting tool 21.

Next, a reflection type liquid crystal display panel using the light reflective film of the invention will be described. An $SiO_2$ film and an ITO film are stacked on the light reflective film of the invention which is produced as described above, a color filter is formed by the electrodeposition method, and a first electrode made of ITO is formed on the color filter. At this time, the first electrode is patterned into a stripe-like form so that the longitudinal direction of the electrode is parallel to an edge of a glass substrate of the light reflection film. Thereafter, an alignment film is formed on the first electrode and an alignment process is performed.

On the other hand, a stripe-like second electrode which is patterned so as to be perpendicular to the longitudinal direction of the first electrode is formed on an opposing substrate, an insulating film is formed on the second electrode, an alignment film is formed on the insulating film, and an alignment process is performed.

The glass substrate having the light reflective film is opposed to the opposing glass substrate via spacers, the two glass substrates are bonded together by a sealing agent, and a liquid crystal is then poured between the substrates, thereby producing the reflection type liquid crystal display panel of the invention.

The light reflective film of the invention is laminated so that its edges are in parallel with the longitudinal direction of the first electrode and that of the second electrode. In other words, the light reflective film is laminated in such a manner that the edges of the light reflective film are parallel to the edges of the glass substrates. As described above, therefore, the linearly continuous ridges 4 of the convex portions 3 which form the rough face 5 of the light reflective film are inclined at the predetermined angle $\theta$ (in the embodiment, $\pi/6$ radians) with respect to the edges of the light reflective film, and the ridges 4 of the convex portions 3 are inclined at the predetermined angle $\theta$ (in the embodiment, $\pi/6$ radians) with respect to the longitudinal direction of the first electrode, and at the predetermined angle $\theta$ (in the embodiment, $\pi/6$ radians) with respect to that of the second electrode also.

Therefore, the pitch of moire fringes becomes so small that the moire fringes cannot be visually seen. Therefore, moire fringes due to the light reflective film and the electrodes can be prevented from occurring. Since the rough face 5 is regularly placed as described above, the light reflective film has a sufficient directivity, and hence can efficiently reflect light in the visual angle direction, so that a bright display screen can be provided. Furthermore, since the light reflective film is required only to be laminated along and in parallel with the edge of the glass substrate, the light reflective film is readily positioned, and can be easily laminated to the glass substrate.

The thus produced reflection type liquid crystal display panel was subjected to a test for moire fringes by a visual inspection. As a result, the inventor ascertained that the reflection type liquid crystal display panel provides a bright display screen which is free from moire fringes. The angle formed by the ridges 4 of the convex portions 3 of the light reflection film, and the longitudinal direction of the first or second electrode was checked by using an electron micrograph which was taken before the pouring of the liquid crystal. As a result, the inventor ascertained that the predetermined angle $\theta$ is satisfactorily reproduced.

In the embodiment, the light reflective film for a reflection type liquid crystal display panel has been described. The invention is not restricted to this. For example, an optical film in which hemispherical convex portions are formed in place of pyramidal convex portions may be used as a microlens array. When this optical film is mounted on a transmission type liquid crystal display panel, the visual angle of the transmission type liquid crystal display panel can be enlarged, the light use efficiency of back light can be enhanced, and occurrence of moire fringes can be suppressed. Since the work of laminating the optical film serving as a microlens array is facilitated as described above, also the productivity of a reflection type liquid crystal display panel is improved.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and the range of equivalency of the claims are therefore intended to be embraced therein.

What is claimed is:

1. An apparatus for producing an optical film, comprising:
a cylindrical die roller having a matrix formed on a surface thereof in which a plurality of rows of concave portions or convex portions that are configured by quadrangular pyramids having square bottom faces and linearly continuous are regularly arranged so as to be adjacently formed in parallel with one another and being defined such that each of the square bottom faces has at least one diagonal ridge line inclined at a predetermined angle of between about 10 degrees and 40 degrees with respect to a direction of a rotation axis of the die roller,
wherein the die roller is rotated on a film to transfer a rough face of the matrix having the convex or concave portions which are linearly continuous, to a surface of the film.

2. An apparatus for producing an optical film, comprising:
a cylindrical die roller having a matrix formed on a surface thereof in which a plurality of rows of concave portions or convex portions that are configured by quadrangular pyramids having square bottom faces and linearly continuous are regularly arranged so as to be adjacently formed in parallel with one another, and being defined such that each of the square bottom faces has at least one diagonal ridge line inclined at a predetermined angle of between about 10 degrees and 40 degrees with respect to a direction of a rotation axis of the cylindrical die roller; and
means for transferring a rough face of a die film to a surface of another film, the rough face being produced by rotating the die roller on the die film and having convex portions or concave portions that are linearly continuous.

3. A method of producing an optical film, comprising the step of:
rotating on a film a cylindrical die roller having a matrix formed on a surface in which a plurality of rows of concave portions or convex portions that are configured by quadrangular pyramids having square bottom faces and linearly continuous, are regularly arranged so as to be adjacently formed in parallel with one another and being defined such that each of the square bottom faces has at least one diagonal ridge line inclined at a predetermined angle of between about 10 degrees and 40 degrees with respect to a direction of a rotation axis of the die roller, to transfer the plurality of rows of concave portions or convex portions to a surface of the film.

4. A method of producing an optical film, the method comprising the steps of:
rotating on a film a cylindrical die roller having a matrix in which the plurality of rows of convex portions or concave portions that are configured by quadrangular pyramids having square bottom faces and linearly continuous are regularly arranged so as to be adjacently formed in parallel with one another and being defined such that each of the square bottom faces has at least one diagonal ridge line inclined at a predetermined angle of between about 10 degrees and 40 degrees with respect to a direction of a rotation axis of the cylindrical die roller, to transfer the plurality of rows of convex portions or concave portions to the film to prepare a die film having a rough face having the plurality of rows of convex portions or concave portions; and
transferring the rough face of the die film to a surface of another film.

5. An apparatus for producing an optical film, comprising:
cylindrical die roller having concave portions or convex portions formed on a surface thereof, the die roller being rotated on a film to transfer the concave portions or convex portions to a surface of the film,
wherein the concave portions or convex portions each include a face having at least one diagonal ridge line inclined at a predetermined angle with respect to a direction of a rotation axis of the die roller,
and the concave portions or convex portions formed on the surface of the die roller are continuously arranged so as to form linear rows, the linear rows being adjacently arranged in parallel with one another and extending in a direction which forms the predetermined angle with respect to a side of the cylindrical die roller.

6. The apparatus of claim 5, wherein the predetermined angle is between about 10 degrees and 80 degrees.

7. The apparatus of claim 5, wherein the predetermined angle is between about 10 degrees and 40 degrees.

8. The apparatus of claim 5, wherein the concave portions or convex portions formed on the surface of the die roller are configured as a pyramid.

9. The apparatus of claim 5, wherein the concave portions or convex portions formed on the surface of the die roller are configured as a regular pyramid.

10. The apparatus of claim 5, wherein the concave portions or convex portions formed on the surface of the die roller are configured as a hemisphere.

11. The apparatus of claim 5, further comprising means for transferring the film to which the concave portions or convex portions are transferred to a surface of another film.

12. A die roller for producing an optical film, comprising:
a cylindrical body having concave portions or convex portions formed on a surface thereof, the concave portions or convex portions being transferred to a surface of a film,
wherein the concave portions or convex portions each include a face having at least one diagonal ridge line inclined at a predetermined angle with respect to a direction of a rotation axis of the die roller,
and the concave portions or convex portions formed on the surface of the cylindrical body are continuously arranged so as to form linear rows, the linear rows being adjacently arranged in parallel with one another and extending in a direction which forms the predetermined angle with respect to a side of the cylindrical body.

13. The die roller of claim 12, wherein the predetermined angle is between about 10 degrees and 80 degrees.

14. The die roller of claim 12, wherein the predetermined angle is between about 10 degrees and 40 degrees.

15. The die roller of claim 12, wherein the concave portions or convex portions formed on the surface of the cylindrical body are configured as a pyramid.

16. The die roller of claim 12, wherein the concave portions or convex portions formed on the surface of the cylindrical body are configured as a regular pyramid.

17. The die roller of claim 12, wherein the concave portions or convex portions formed on the surface of the cylindrical body are configured as a hemisphere.

* * * * *